US008621472B2

(12) United States Patent
Longobardi et al.

(10) Patent No.: US 8,621,472 B2
(45) Date of Patent: *Dec. 31, 2013

(54) JOB SCHEDULING WITH OPTIMIZATION OF POWER CONSUMPTION

(75) Inventors: Giuseppe Longobardi, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/917,549

(22) Filed: Nov. 2, 2010

(65) Prior Publication Data

US 2011/0107341 A1    May 5, 2011

(30) Foreign Application Priority Data

Nov. 3, 2009   (EP) .................................... 09174854

(51) Int. Cl.
*G06F 9/46*    (2006.01)
(52) U.S. Cl.
USPC ............ 718/102; 718/100; 718/103; 718/106
(58) Field of Classification Search
USPC .......................... 718/100, 102, 104, 103, 106
See application file for complete search history.

(56) References Cited

U.S. PATENT DOCUMENTS

| 7,302,450 | B2 * | 11/2007 | Benedetti et al. ..................... 1/1 |
| 7,849,285 | B2 * | 12/2010 | Tabata et al. .................. 711/170 |
| 7,979,859 | B2 * | 7/2011 | Li et al. ......................... 718/102 |
| 8,166,145 | B2 * | 4/2012 | Tran et al. ...................... 709/223 |
| 8,397,235 | B2 * | 3/2013 | Dong et al. .................... 718/100 |
| 2005/0132167 | A1 * | 6/2005 | Longobardi ................... 712/201 |
| 2008/0010642 | A1 * | 1/2008 | MacLellan et al. ........... 718/102 |
| 2009/0055520 | A1 | 2/2009 | Tabata et al. |
| 2009/0183157 | A1 * | 7/2009 | Tran et al. ...................... 718/100 |
| 2009/0307519 | A1 | 12/2009 | Hyatt |
| 2012/0260260 | A1 * | 10/2012 | Cardelli et al. ............... 718/106 |

OTHER PUBLICATIONS

Krishnapura et al. "A Dynamic Real-time Scheduling Algorithm for Reduced Energy Consumption" CSE Technical resports, May 2004. pp. 1-34.*
Michael Armbrust, Armando Fox, Rean Griffith, Anthony D. Joseph, Randy Katz, Andy Konwinski, Gunho Lee, David Patterson, Ariel Rabkin, Ion Stoica, and Matei Zaharia; "Above the Clouds: A Berkley View of Cloud Computing", Feb. 10, 2009.
Pete Soto et al., "Getting Started with IBM Tivoli Workload Scheduler V8.3: Best Practices and Performance Improvements", IBM International Technical Support Organization, Redbooks, SG24-7237-00, Oct. 30, 2006.

(Continued)

*Primary Examiner* — Emerson Puente
*Assistant Examiner* — Willy W Huaracha
(74) *Attorney, Agent, or Firm* — Thomas E. Lees, LLC

(57) ABSTRACT

A scheduler is provided, which takes into account the location of the data to be accessed by a set of jobs. Once all the dependencies and the scheduling constraints of the plan are respected, the scheduler optimizes the order of the remaining jobs to be run, also considering the location of the data to be accessed. Several jobs needing an access to a dataset on a specific disk may be grouped together so that the grouped jobs are executed in succession, e.g., to prevent activating and deactivating the storage device several times, thus improving the power consumption and also avoiding input output performances degradation.

10 Claims, 5 Drawing Sheets

(56) References Cited

OTHER PUBLICATIONS

Vasfi Gucer et al., "IBM Tivoli Workload Scheduler for z/OS Best Practices: End-to-end and mainframe scheduling", IBM International Technical Support Organization, Redbooks, SG24-7156-01, May 2006.

Office Action dated May 16, 2013 for U.S. Appl. No. 13/461,980, Giuseppe Longobardi et al., "Job Scheduling with Optimization of Power Consumption", filed May 2, 2012.

* cited by examiner

# JOB SCHEDULING WITH OPTIMIZATION OF POWER CONSUMPTION

CROSS-REFERENCE TO RELATED APPLICATIONS

This application claims priority to European Patent Application No. 09174854.1, filed Nov. 3, 2009, entitled A METHOD AND SYSTEM FOR JOB SCHEDULING WITH OPTIMIZATION OF POWER CONSUMPTION, the disclosure of which is incorporated herein by reference.

BACKGROUND

Various aspects herein relate to the field of data processing systems, and more particularly, to job scheduling with optimizations for reducing system power consumption.

A data processing system employing the scheduling of applications typically uses batch processing to control the submission of different work units, such as jobs. For this purpose, several types of schedulers have been proposed to automate the submission of large quantities of jobs. An example of a scheduler is the IBM Tivoli Workload Scheduler for z/OS, by International Business Machines Corporation.

A scheduler submits jobs according to a predefined plan, which establishes a desired flow of execution of the jobs. Whenever a job must be submitted, the scheduler dispatches an execution request to a corresponding agent. The agent directly controls the execution of the job and returns feedback information to the scheduler.

BRIEF SUMMARY

According to aspects of the present invention, systems and computer program products are provided for scheduling the submission of work units for execution on a data processing system having a plurality of resources, comprises identifying a plan of execution of work units. In this regard, the plan includes a set of precedence rules according to which time constraints are imposed in the order of execution of the work units. Moreover, each work unit requires at least one resource for the execution and has at least one attribute indicative of the resource requirement for the work unit. The scheduling of submission of work units further comprises inspecting the attributes of the work units to identify those work units accessing a predetermined common resource, rearranging the plan of execution so that the identified work units are executed in succession provided the precedence rules are respected, and submitting the rearranged plan for execution.

DETAILED DESCRIPTION

Figure 1:
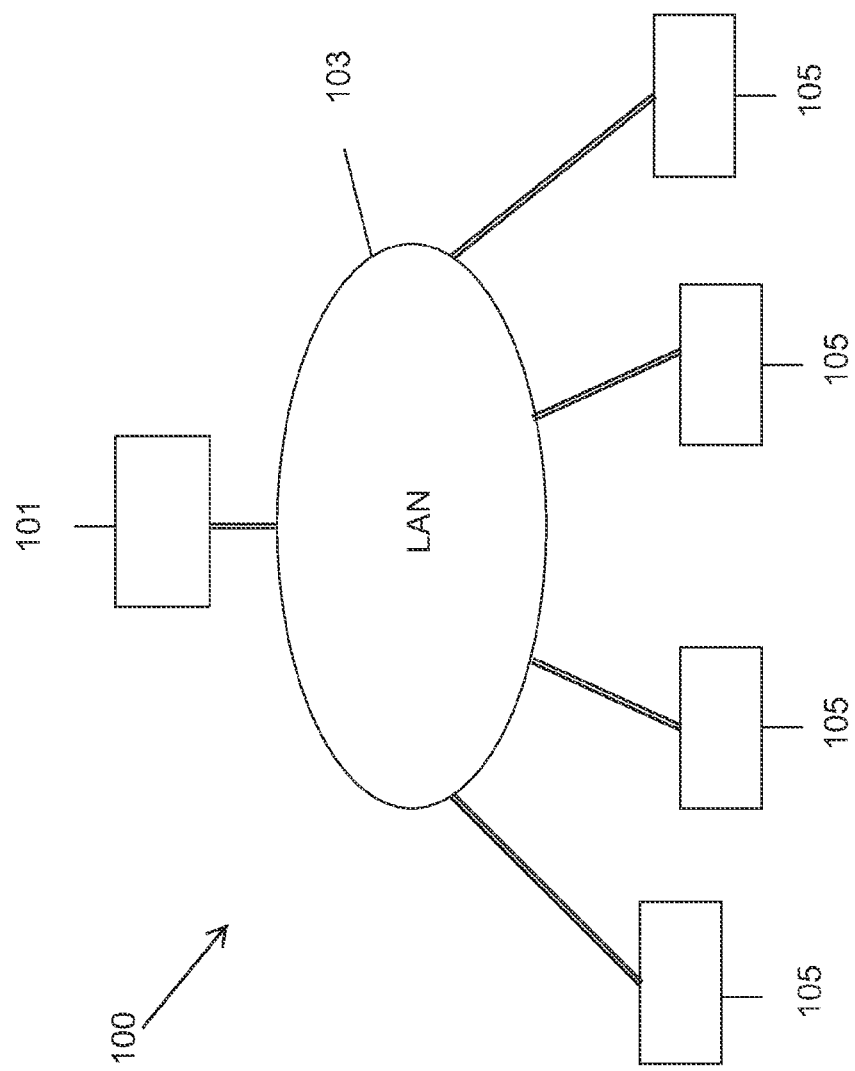
FIG. 1 shows an example of a computer network to which a method of scheduling the submission of work units is applied, according to various aspects of the present invention.

Referring now to the drawings, and in particular, to FIG. 1, an exemplary architecture 100 comprises a scheduling system 101, which is connected through a network 103, e.g., a local area network (LAN), to a number of common system resources servers 105. The system resources servers 105 collectively control resource access according to system requests in response to the execution of jobs scheduled by the scheduling system 101. The scheduling system 101 can be implemented, for example, by a Tivoli Workload Scheduler for z/OS controller application handling the planning and the control of the workload to be run on the system resources according to approaches set out in greater detail herein. In this regard, the scheduling system 101 can hold information such as calendar and time schedule definitions, workload and resource properties, job running attributes, and the like. The system resources servers 105 comprise z/OS systems, workstations, etc., that execute the unit of work (jobs). The common system resources can be, just as a few non-limitative examples: storage devices (e.g. a Direct Access Storage Device (DASD) or a tape reader), central processing unit (CPU), output devices or communication subsystems. In an illustrative example, a common resource can be any device having an activation/deactivation time during which no activity, e.g., reading or writing, can be performed on the device.

Figure 2:
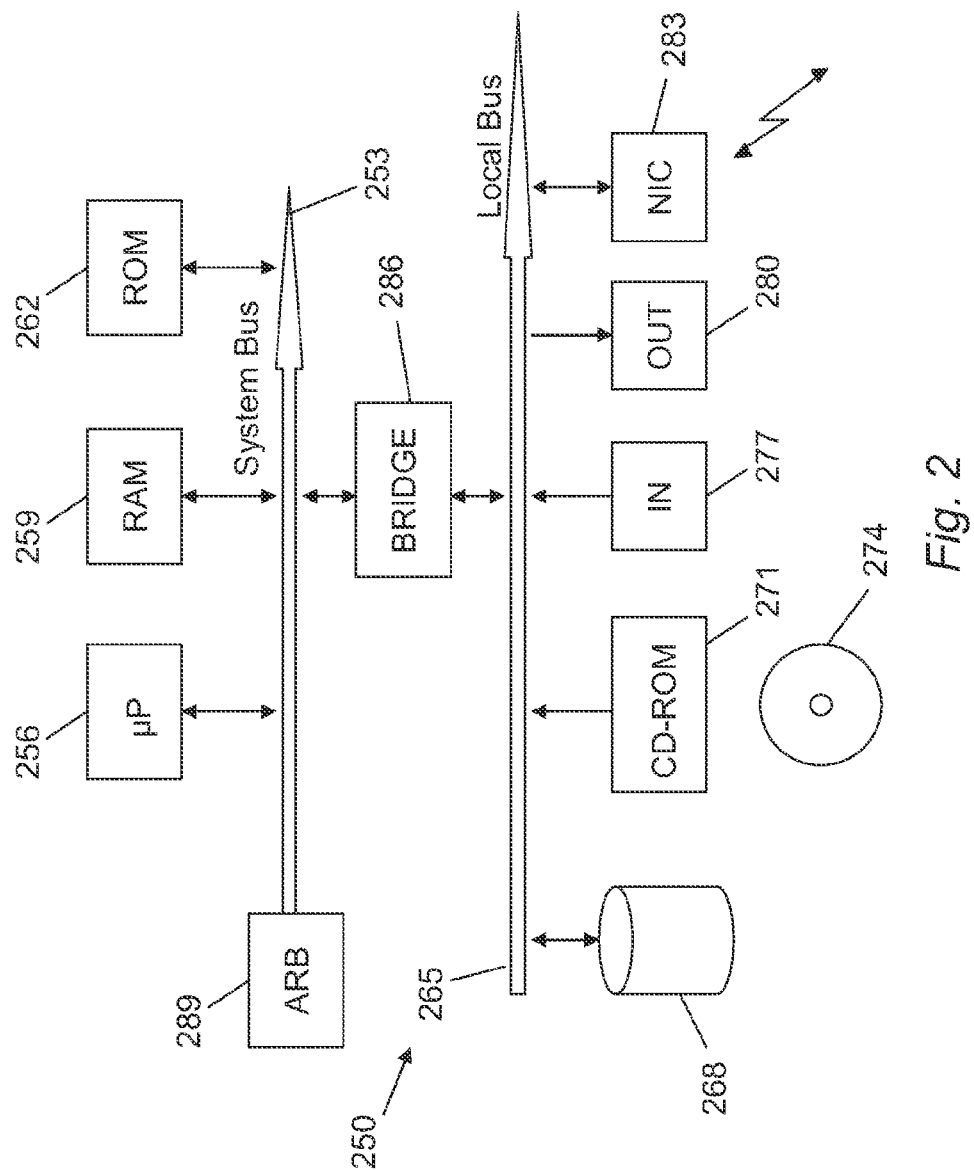
FIG. 2 is a diagram of a general computer system adapted to support job scheduling according to aspects of the present invention.

With reference to FIG. 2, a diagram of an exemplary computer 250 is illustrated, which may be utilized in the architecture 100 of FIG. 1, e.g., a computer executing the scheduling system 101 and/or a computer implementing one or more of the system resources servers 105, is illustrated. Thus, the generic computer 250 may implement an Internet server, router, remote server, resources, etc. The computer 250 is formed by several units that are connected in parallel to a system bus 253. In detail, one or more microprocessors 256 control operation of the computer 250. A random access memory (RAM) 259 is directly used as a working memory by the microprocessor(s) 256, and a read-only memory (ROM) 262 stores basic code for a bootstrap of the computer 250.

Peripheral units are clustered around a local bus 265 by means of respective interfaces. Particularly, a mass memory consists of a hard-disk 268 and a drive 271 for reading CD-ROMs 274. Moreover, the computer 250 includes input devices 277, for example, a keyboard and a mouse. The computer 250 also includes output devices 280, for example, a monitor and a printer. A Network Interface Card 283 is used to connect the computer 250 to the network, e.g., the network 103 illustrated. A bridge unit 286 interfaces the system bus 253 with the local bus 265.

In the illustrative computer 250, microprocessor 256 and the bridge unit 286 can operate as master agents requesting an access to the system bus 253 for transmitting information. An arbiter 289 manages the granting of the access with mutual exclusion to the system bus 253. Similar considerations apply if the particularly implemented computer has a different topology, or it is based on other networks. Alternatively, the computers may have a different structure or may include equivalent units. Still further, the computers may consist of other data processing entities, such as personal data assistants (PDAs), mobile phones, and the like.

Information, including programs and data, is typically stored on hard-disks and is loaded, at least partially, into the corresponding working memories when the programs are running. In this regard, the working memories may store the information together with an operating system and other application programs, which are not shown in the figure. The programs are normally initially installed onto the hard disks, for example, from CD-ROMs.

Figure 3:
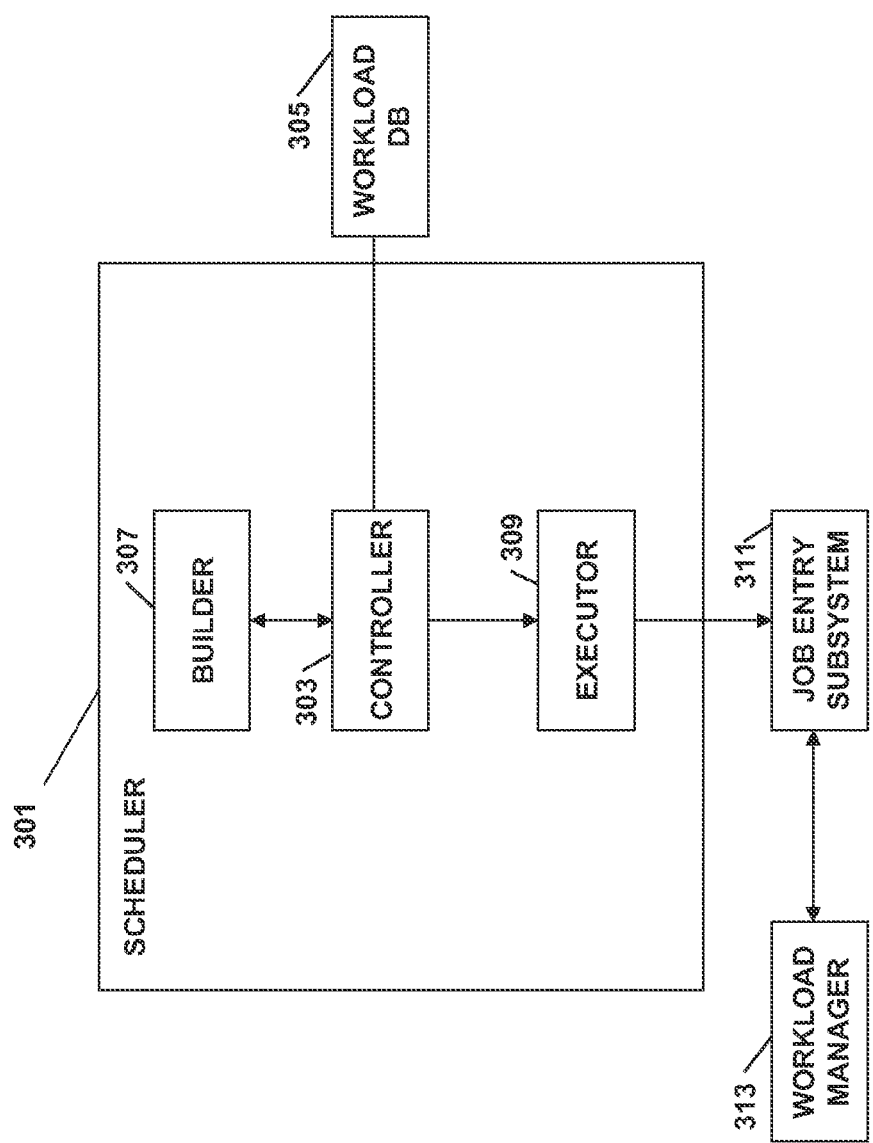
FIG. 3 is a block diagram of the software architecture of a job scheduling system according to aspects of the present invention.

Referring to FIG. 3, software components that can be used to practice aspects of the present invention are depicted. Particularly, a central scheduling application controls the execution of different jobs. For example, the jobs can consist of payroll programs, cost analysis applications, and the like. The central scheduling application is composed of a job scheduler 301 including a controller 303 for managing execution of a series of non-interactive jobs, typically during the evening. The controller 303 accesses a workload database 305, which stores information about the different jobs to be executed. For each job, the workload database 305 includes a description of the corresponding steps, a planned time of execution, and any dependency from other jobs or resources of the system. Moreover, the workload database 305 stores a record indicating an estimated duration of the job.

According to aspects of the present invention, a profile may be associated with a corresponding job in the workload database 305. For instance, a profile may be associated with a corresponding job, at least for the jobs that are run regularly. The profile includes multiple attributes of the job, where each attribute is indicative of the usage of a corresponding resource that is likely to be required by the job during its execution.

For example, an attribute of the profile represents an estimated processing power consumption. A different attribute can indicate an estimated (working) memory requirement. A further attribute can specify an estimated input/output activity. The different attributes are expressed, for example, as percentage values.

The scheduler 301 may be sophisticated in handling temporal and predecessor constraints, for example, as defined by the completion of other jobs or by the availability of system resources. However, according to aspects of the present invention, the scheduler 301 takes into account the location of the data to be accessed by a set of jobs. Once all the dependencies and the scheduling constraints of the plan are respected, the scheduler optimizes the order of the remaining jobs to be run, also considering the location of the data to be accessed. Such optimization may be utilized in cloud computing environments, for example. In an illustrative example, several jobs needing an access to a dataset on a specific disk are grouped together so that the grouped jobs are executed in succession. This prevents activating and deactivating the storage device several times, reducing the power consumption and also avoiding input/output performances degradation, as will be described in greater detail herein.

A method according to aspects of the present invention, analyzes job control language (JCL) cards, to understand which jobs to be scheduled, have involved datasets. The analysis of JCL cards may comprise, for example, a scan that is carried out in part, to read parameters of the jobs to be scheduled. The information collected as part of the JCL analysis should be included in an attribute so that the information is available when a corresponding job plan is reconsidered, e.g., in certain illustrative implementations. Another type of useful information to be included in the profile attributes is the location of the datasets within the system, e.g., system queries that can be run, as done by a job entry subsystem (JES) when the job is submitted.

The scheduled jobs have an Input Arrival time. When defining the plan, the input arrival time of a given scheduled job may be declared as fixed, or the input arrival time might be declared as flexible. The input arrival time of jobs having a flexible input arrival time, may be modified for peripheral devices power optimization. The dependencies and the priorities are normally set. Thus, network of jobs is built according to the plan.

The controller 303 transmits the description of each job to be executed, e.g., stored in the workload database 305, to a builder 307. The builder 307 creates plans for controlling a flow of execution of batches of jobs in a determined sequence. Each plan is built according to a desired scheduling strategy. For example, an illustrative plan may be built to balance a load of the computer or to optimize a peak performance of the corresponding computer. According to aspects of the present invention, the plan can be modified, if the conditions exist, i.e., the time constraints can be respected, to allow jobs accessing same storage resources to be executed in succession in order to reduce power consumption as explained above. The plan is supplied, through the controller 303, to an executor 309.

The executor 309 selects the jobs to be run according to the selected plan. The selected jobs are then submitted for execution to the operating system (not shown). The jobs are received by the operating system via a job entry subsystem 311. The job entry subsystem 311 controls the running of a current instance of each submitted job. Moreover, the job entry subsystem 311 interfaces with a workload manager 313. The workload manager 313 monitors the running jobs. The workload manager 313 also allocates the appropriate resources of the computer to the different running jobs, in order to optimize load balancing and overall performance.

Once the current instance of a generic job terminates its execution, e.g., because all the operations have been completed or an error has occurred, feedback information is returned to the controller 303 via the executor 309. The feedback information includes an actual start time and an actual end time of the terminated instance of the job, a return code specifying the result of the operations, and the like. The controller 303 uses this information to calculate a duration of the terminated job, in order to predict how long the job should run in the future. The corresponding record indicating the estimated duration of the job is updated accordingly in the workload database 305.

Optionally, a reporting module can collect statistics about the terminated job. For example, the collected statistics may include the consumption of processing power (expressed in microprocessor time units, such as seconds), the memory usage (expressed in number of bytes), the input/output activity (expressed in number of performed operations), and the like. The information collected by the reporting module can be logged into a job statistics database for later reuse and for system optimization purposes.

Similar considerations apply if the programs and the corresponding data are structured in another way, if different modules or functions are supported, or if the programs are provided on equivalent computer readable medium, such as one or more floppy disks. Alternatively, the jobs may be described in the workload database in a manner different than that set out in the examples herein. Moreover, the attributes may be expressed with equivalent values, or the profiles of the jobs may include other information. Likewise, as an alternative to that set out by example herein, the scheduler 301 may receive equivalent feedback information for each terminated job, the statistics may be collected in a different way, and/or the job statistics database may include other information, for example, the number of consumed service units, defined as an intelligent mix of various factors. In any case, the concepts of the present invention are also applicable when the profiles are used by the workload manager to adjust the distribution of the resources that are allocated to the running jobs, or even when the operating system does not include any workload manager. Moreover, aspects of the invention are suitable to be used for scheduling the submission of different jobs, interactive tasks, or more generally any other work unit.

The scheduler 301 can also be provided with other features, such as a Graphical User Interface (GUI), which allows creating, modifying and deleting the definition of the jobs or plans, and which allows controlling and monitoring the operations performed by the scheduler. Moreover, the scheduler 301 may integrate performance monitoring, load balancing and/or reporting functions. Still further, the scheduler 301 may be able to resolve simple dependencies, which condition the submission of the jobs to a particular resource or set of resources. Moreover, the scheduler 301 may help an operator select the jobs to be submitted whenever their number exceeds a maximum allowable value, thus limiting the number of jobs that are running concurrently to avoid excessive contention for the resources of the system. For example, the operator can assign a weight to each job, representing a supposed impact of the job on the system performance. Such weights are used by the scheduler to assign different priorities to the jobs to be submitted.

Normally, the jobs running on a system, which are scheduled by the scheduler 301, access data that is located on storage devices, such as disks, cartridges and optical disks. Each device has its own activation time, i.e., the time to reach the rotation operative speed, e.g., for the example the operative speed of a tape drive or hard drive; the time required to mechanically load a tape, etc. Each device also has its own deactivation time, i.e., the time a device requires to stop after being idle for a certain interval, during such useless times the device consumes an amount of power un-necessarily. Therefore, differences can result when reading data on the same device consecutively, with respect to reading the data highly fragmented in time, i.e., with several device activations/deactivations in between, thus resulting in relative un-necessary power consumption. Furthermore, non-optimal input/output performances could result with respect to reading the data highly fragmented in time. However, according to aspects of the present invention, the scheduler 301 may consider, in addition to other factors, the location of the data that needs to be accessed and/or the activity of the devices related to the data retrieval. As such, job schedules are created that attempt to minimize accesses to the same device fragmented in time.

Figure 4:
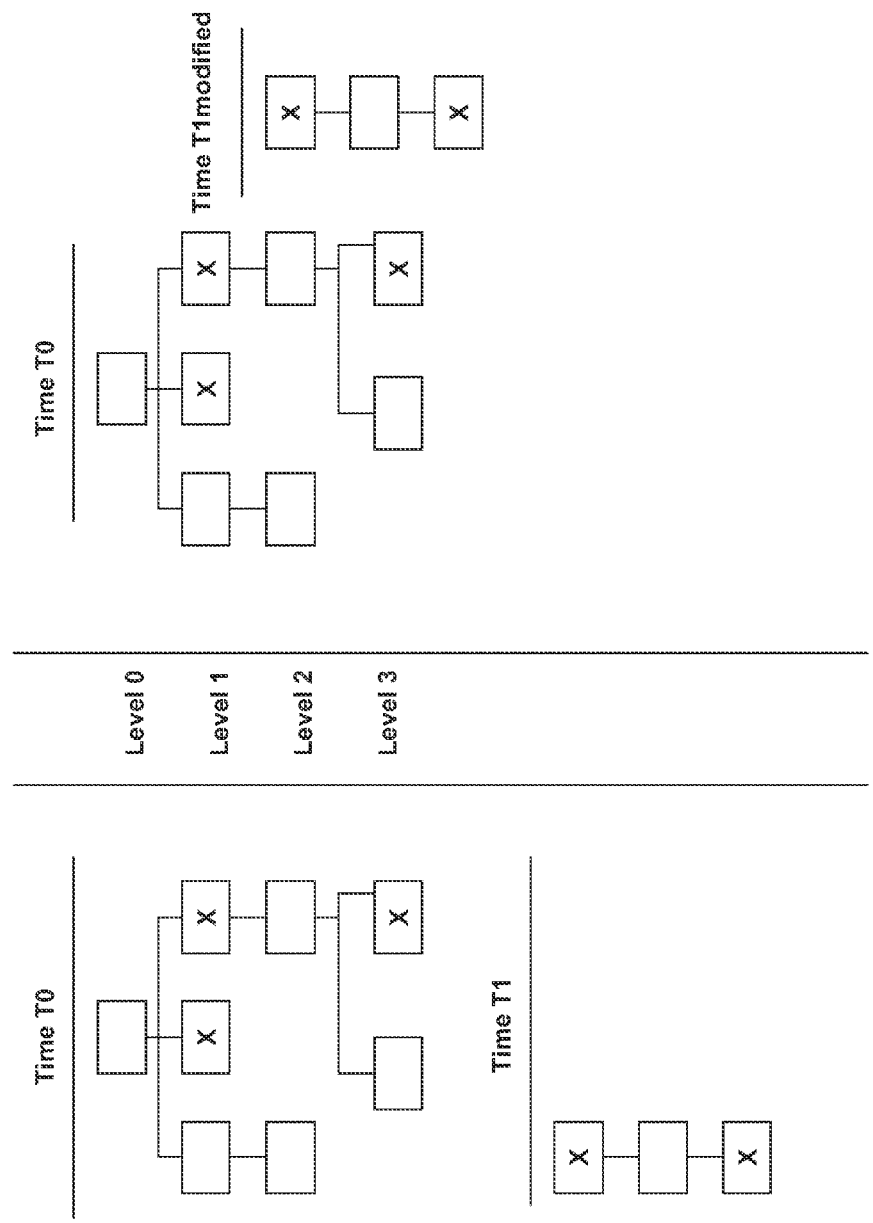
FIGS. 4a and 4b illustrate an exemplary jobs plan for optimizing according to various aspects of the present invention.

Referring to FIGS. 4A and 4B, in the illustrative example, shown, a time T1 is not "fixed" and may be re-arranged by the optimization mechanism. The boxes with an "X" inside represent jobs with the same input/output data location. In this regard, the second stream can be moved so that the time T1 corresponds to the time of the level 2 of the first stream so that the data is accessed in sequence after the level 1 jobs of the first stream. The level 3 job of the first stream cannot be anticipated since it is fixed on its level due to the set dependencies. The scheduling arrangement of FIG. 4B improves performance over the scheduling of FIG. 4A, e.g., by positioning the second stream so that the jobs accessing the same data system location are run in a more tight sequence.

Methods according to aspects of the present invention take into account the location of the data to be accessed by a set of jobs. Once all the dependencies and the scheduling constraints of the plan are respected, the scheduler optimizes the order of the remaining jobs to be run, also considering the location of the data to be accessed.

Ideally several jobs needing an access to a dataset on a specific disk can be grouped together so that the grouped jobs are executed in succession, e.g., to prevent activating and deactivating the storage device several times, thus improving the power consumption and also avoiding I/O performances degradation.

Another possible implementation could be with those systems where data is stored on cartridges. In such systems, cartridges are mounted and demounted several times by running a tape-robot. The process of mounting and demounting cartridges by a tape-robot consumes time and energy. On the contrary if several jobs needing access to a specific disk are grouped together, an associated cartridge needs to be mounted as few as one time, all the data will be read and then the cartridge can be demounted. This will be transparent for the end user who will notice a reduction of the power consumption and will likely benefit also of an improvement of the overall response time. In general any system accessing devices having an activation/deactivation time can benefit by the various approaches for scheduling submission of work units, as described more fully herein. f.

Figure 5:
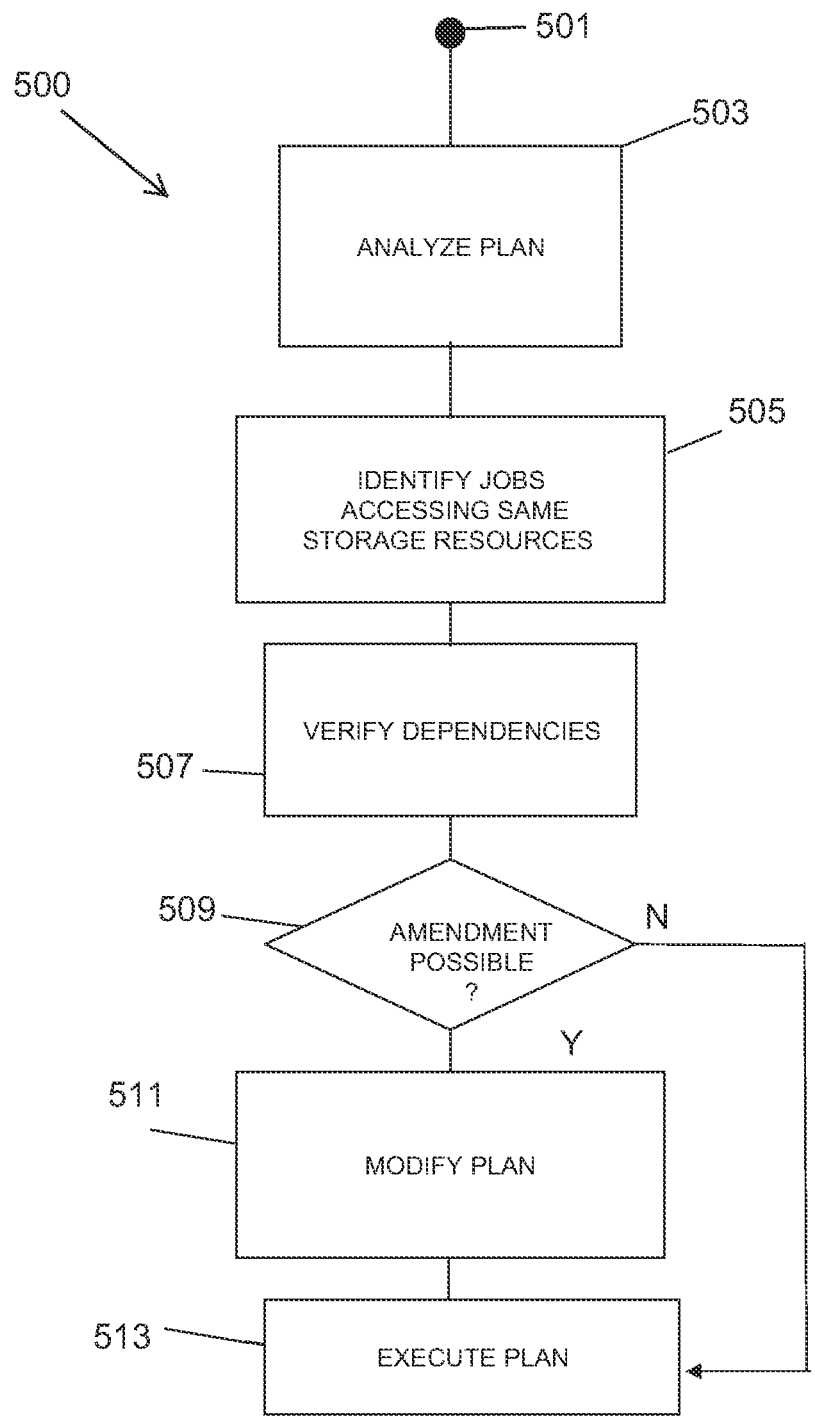
FIG. 5 shows a flowchart representing a method of processing a job plan according to aspects of the present invention.

FIG. 5 schematically shows a method 500 according to aspects of the present invention. The process starts at 501 and goes to 503 where the scheduling plan is analyzed to identify (505) those jobs which need to access the same common resource, e.g., a storage device such as a Direct Access Storage Device. A check is performed at 507 to verify whether dependencies or constraints exist which impose a specific precedence order. Such specific precedence order can be controlled by a set of precedence rules defining dependencies or constraints which might condition, or force, the execution order. If a rearrangement of the plan is possible at 509 in order to start a job needing a storage resource immediately after another job using the same resource, but without infringing any time constraints in the order of execution of the jobs, then the plan is modified at 511 and the plan can be executed at 513. Otherwise, the plan is executed in its original form.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible. Moreover, it is expressly intended that specific elements and/or method steps described in connection with any disclosed embodiment of the invention may be incorporated in any other embodiment as a general matter of design choice.

For example, similar considerations apply if the computers have different structure or include equivalent units. In any case, it is possible to replace the computers with any code execution entity, such as a PDA, a mobile phone, and the like.

Similar considerations apply if the program, which may be used to implement each embodiment of the invention, is structured in a different way, or if additional modules or functions are provided. Likewise, the memory structures may be of other types, or may be replaced with equivalent entities, not necessarily consisting of physical storage media. Moreover, the proposed solution lends itself to be implemented with an equivalent method, e.g., having similar or additional steps, even in a different order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A computer program product to schedule submission of work units for execution on a data processing system having a plurality of resources, comprising:
computer readable memory having computer readable program code embodied therewith, the computer readable program code comprising:
computer readable program code configured to identify a plan of execution of a first stream of work units and a second stream of work units, the plan including a set of precedence rules according to which time constraints are imposed in the order of execution of the work units of the first stream and the second stream, each work unit requiring at least one resource for the execution and having at least one attribute indicative of the resource requirement for the work unit;
computer readable program code configured to inspect the attributes of the first stream of work units and the second stream of work units to identify those work units that access a predetermined common resource, wherein the inspection occurs independently of whether the predetermined common resource is active;
computer readable program code configured to perform a check, using the set of precedence rules, to verify whether dependencies or constraints exist that affect an execution order;
computer readable program code configured to determine whether rearrangement of the plan of execution is possible based on the indentified work units accessing the same resource and their dependencies or constrains that exist;
computer readable program code configured to, if rearrangement is possible, rearrange the plan of execution so that the identified work units are executed in succession provided the precedence rules are respected such that a work unit from the first stream that accesses the common resource is pulled in to be executed before a work unit from the second stream that also accesses the common resource but must wait on a work unit from the second stream that does not access the common resource to complete, wherein the work unit from the second stream that accesses the common resource was originally scheduled to be executed before the work unit from the first stream that accesses the common resource; and
computer readable program code configured to submit the rearranged plan for execution;
computer readable program code configured to, if rearrangement is not possible, submit the identified plan for execution.

2. The computer program product of claim 1, wherein the computer readable program code configured to inspect the attributes of the work units identifies those work units accessing a predetermined common resource implemented as a storage resource.

3. The computer program product of claim 2, wherein the computer readable program code configured to inspect the attributes of the work units inspects a storage resource having an activation and a deactivation time during which, data cannot be read.

4. The computer program product of claim 2, wherein the computer readable program code configured to inspect the attributes of the work units inspects a storage resource including a Direct Access Storage Device.

5. The computer program product of claim 2, wherein the computer readable program code configured to inspect the attributes of the work units inspects a storage resource including a tape cartridge.

6. The computer program product of claim 1, wherein the computer readable program code configured to identify a plan of execution of work units, comprises:
computer readable program code configured to access a workload database that stores information about the different work units by storing information associated with a plurality of work units.

7. The computer program product of claim 6, wherein the computer readable program code configured to access a workload database accesses at least one work unit that has a profile associated therewith, the profile including multiple attributes of the work unit, where each attribute is indicative of the usage of a corresponding resource that is likely to be required by the work unit during its execution.

8. The computer program product of claim 6, further comprising:
computer readable program code configured to receive feedback that a current instance of a work unit has terminated;
computer readable program code configured to calculate a duration of the terminated work unit; and
computer readable program code configured to store the duration information in the profile associated with the terminated work unit to predict how long it takes to execute the terminated work unit.

9. The computer program product according to claim 1, wherein:
the computer readable program code configured to rearrange the plan of execution comprises:
computer readable program code configured to identify an input arrival time of each scheduled work unit;
computer readable program code configured to determine whether each identified input arrival time is declared as fixed or flexible; and
computer readable program code configured to modify the input arrival time of select ones of the work units having declared flexible input arrival times.

10. The computer program product according to claim 9, wherein the computer readable program code configured to modify the input arrival time of select ones of the work units comprises:
computer readable program code configured to modify the input arrival time of select ones of the work units to optimize a peripheral device power consumption.

* * * * *